United States Patent [19]

Heller et al.

[11] Patent Number: 5,916,943
[45] Date of Patent: Jun. 29, 1999

[54] METHOD OF MARKING AN ARTICLE

[75] Inventors: Harry George Heller, Cardiff; Mark John Vincent, Houston, both of United Kingdom

[73] Assignee: BICC Public Limited Company, London, United Kingdom

[21] Appl. No.: 08/952,729

[22] PCT Filed: May 17, 1996

[86] PCT No.: PCT/GB96/01175

§ 371 Date: Apr. 1, 1998

§ 102(e) Date: Apr. 1, 1998

[87] PCT Pub. No.: WO96/37369

PCT Pub. Date: Nov. 28, 1996

[30] Foreign Application Priority Data

May 13, 1995 [GB] United Kingdom .................... 9514343
May 25, 1995 [GB] United Kingdom .................... 9510655

[51] Int. Cl.⁶ .............................. C08K 5/07; H01M 6/04; C08F 2/46

[52] U.S. Cl. ................. 524/360; 430/200; 522/2

[58] Field of Search .................. 524/360; 522/2; 430/200

[56] References Cited

U.S. PATENT DOCUMENTS

| 4,371,711 | 2/1983 | Saito . | |
| 5,373,039 | 12/1994 | Sakai et al. .............................. | 524/100 |

FOREIGN PATENT DOCUMENTS

| 022162 | 1/1981 | European Pat. Off. . |
| 572178 | 12/1993 | European Pat. Off. . |
| 61-61123 | 9/1994 | Japan . |

*Primary Examiner*—Veronica P. Hoke
*Attorney, Agent, or Firm*—Gary M. Nath; Nath & Associates

[57] ABSTRACT

Laser marking compositions, articles of manufacture using same and methods of preparing said articles and compositions are disclosed which comprise a polymer including a cyclopentanone compound which is thermally stable at temperatures required to melt process polymers, but which will eliminate water when subjected to an excimer laser to form a visible mark comprising a cyclopentadienone.

21 Claims, No Drawings

METHOD OF MARKING AN ARTICLE

This invention relates to articles that can be marked and to marking of articles, and especially, although not exclusively, to laser marking of articles.

Laser marking methods have become widespread in recent years for applying visible marks such as alphanumerics indicia to various articles, for example to electrical wires and cable. Laser writing on plastics, polymers, thin films (such as cellophane), paints, and varnishes can be achieved by burning, melting or ablation of the surface. These types of laser writing can lead to surface damage and reduce the durability of the material (e.g. the insulating coating on fine wires). Other processes, for example, foaming of the material or partial carbonisation of the material to provide a visible mark, can lead to damage if the energy of the laser pulse is too high or lead to a mark which lacks wear resistance if the energy of the laser pulse is too low.

Alternative processes comprise the application of lacquer to the surface of the plastic so that as the lacquer is ablated by the laser energy, exposing the plastic to produce a contrasting mark (this process involves risk of surface damage and the additional coating process adds substantially to the cost) or irradiating a material that will change colour when subjected to a pulse of laser energy. In the latter process, an ultraviolet laser, such as an excimer laser, is normally employed and the article contains a material that will change colour when subjected to the laser radiation.

Typically, titanium dioxide is employed in a concentration of 5–10% by weight but such systems, containing the titanium dioxide as a suspension, can suffer from the disadvantage that the concentgration of titanium oxide can adversely affect the physical properties of the article.

A recent patent describes yellow and red dyes incorporated into plastic to give an orange lacquer which is bleached by lasers to generate a yellow mark on a red background (Ciba Geigy EP 0327508). This process lacks the required contrast for laser writing in many instances. In addition, EP-A-0 572 178 describes resin compositions for laser marking which comprise a thermoplastic resin, one or more compounds selected from tetrazole compounds, sulfonylhydrazide compounds, nitroso compounds and azo compounds, carbon black and optionally a flame-retarding agent.

It is an object of the present invention to provide a system in which the material that will change colour can be incorporated into a range of p[polymers, especially at relatively low concentration, and will provide a highly visible mark after irradiation. Since the material may have to be incorporated into the whole product it is preferably of relatively low cost, i.e. it is preferably capable of being prepared in high yield and purity from inexpensive reactants in a simple one-step process.

According to one aspect, the invention provides an article of manufacture which has a surface formed from a polymer composition, the polymer composition incorporating a quantity of a compound of the general formula I

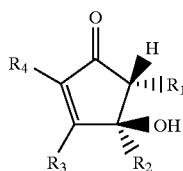

I wherein $R_1$ and $R_4$ which may be the same or different, each is a straight-chain, branched-chain or cyclic alkyl group or an aryl group, which groups may be unsubstituted or substituted and may include one or more hetero atoms;

$R_2$ is a straight-chain, branched-chain or cyclic alkyl group or an aryl group which may be unsubstituted or substituted and may include one or more hetero atoms, but which does not include any eliminatable α-hydrogen atoms; and $R_3$, which may be fused with or separate from $R_2$ or which may be fused with or separate from $R_4$, is straight-chain, branched-chain or cyclic alkyl group or an aryl group which may be unsubstituted and many include one or more hetero atoms;

provided that, whenever water is eliminated from the compound of the general formula I to form a cyclopentadienone, the groups $R_1$ and $R_4$ together have sufficient conjugated unsaturation to produce an absorption band in the visible spectrum.

According to another aspect, the invention provides a method of marking an article which has a surface formed from a polymer composition that incorporates a quantity of a compound of the general formula I

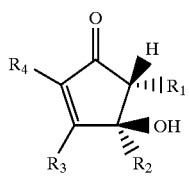

I wherein $R_1$ and $R_4$ which may be the same or different, each is a straight-chain, branched-chain or cyclic alkyl group or an aryl group, which groups may be unsubstituted or substituted and may include one or more hetero atoms;

$R_2$ is a straight-chain, branched-chain or cyclic alkyl group or an aryl group which may be unsubstituted or substituted and may include one or more hetero atoms, but which does not include any eliminatable α-hydrogen atoms; and $R_3$, which may be fused with or separate from $R_2$ or which may be fused with or separate from $R_4$, is a straight-chain, branched-chain or cyclic alkyl group or an aryl group which may be unsubstituted or substituted and may include one or more hetero atoms; provide that, when water is eliminated from the compound of the general formula I to form a cyclopentadienone, the groups $R_1$ to $R_4$ together have sufficient conjugated unsaturation to produce an absorption band in the visible spectrum;

which comprises irradiating selected parts of the surface with a laser to form visible marks thereon.

We have observed that it is possible to form highly visible permanent marks on the polymeric surface of the article by irradiation of the article with an excimer laser, whereas, if the compounds are dispersed in a solvent instead of a polymer, no such visible colour change occurs. Although the colourless hydroxyketone of the general formula I and the cyclopentadienone of the general formula II are known per se and may be formed by methods known in the art, it has generally been understood that the hydroxyketone has a trans configuration. We have discovered that these hydroxyketones do not have a trans configuration but instead have a cis configuration. The present invention is based partly on the appreciation that the colourless hydroxyketone has, in fact, a cis arrangement of the groups $R_1$ and $R_2$, and therefore a cis arrangement of the 3-hydroxy group and the 2-hydrogen atom (as verified by X-Ray diffraction) rather than a trans arrangement. In view of the cis arrangement, the compound is thermally stable at melt processing temperatures employed for plastics in the absence of an acid catalyst. Without being bound to any particular theory, it is believed that the colour change of the compound occurs by α-cleavage of the compound which allows rotation about the 2-carbon atom and recombination to produce a hydroxyketone in which the 2-hydrogen and the 3-hydroxy group are in the trans-configuration, followed by thermal dehydration under the action of the laser, to produce the coloured cyclopentadienone II, according to the following scheme:

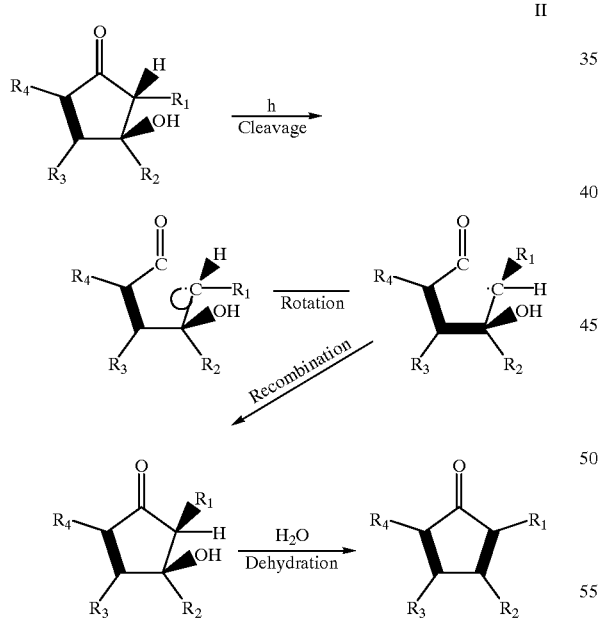

Furthermore, it is believed that this reaction is allowed when the compound is dispersed in a polymer matrix since the polymer matrix will prevent fusion of the groups $R_3$ and $R_4$, whereas when the compound is irradiated in a solvent the preferential cyclisation, and oxidation, and dehydration reactions occur:

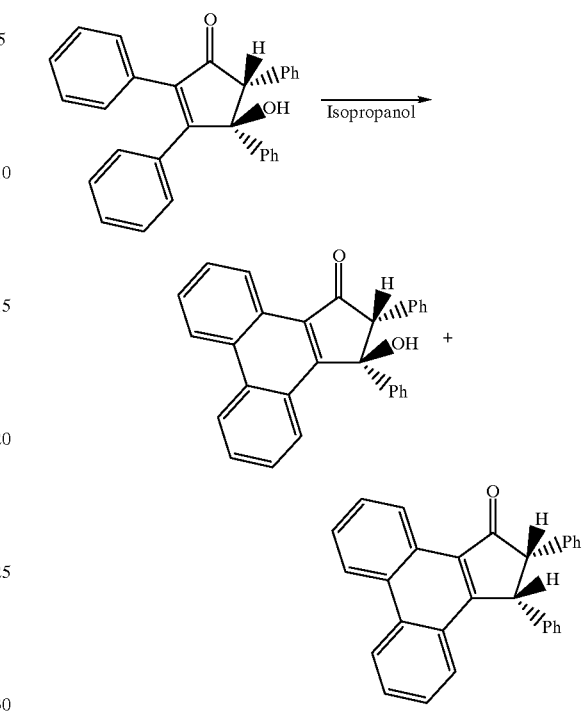

As stated above, the group $R_2$ should not contain any eliminatable hydrogen atoms, that is to say it should contain any hydrogen atoms that would be eliminated in preference to the hydrogen atom in the 2-position when the compound is dehydrated. For example, where $R_2$ and $R_3$ are methyl groups, the resistance of the cis hydroxyketone to form an endocyclic double bond is illustrated by the following scheme in which dehydration occurs to form an exocyclic double bond.

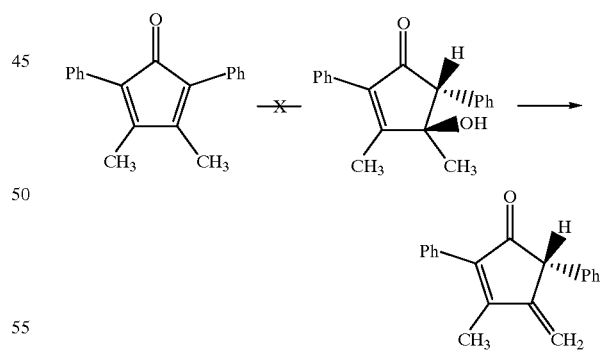

The group $R_2$ may, however, contain hydrogen atoms in the 1 position if, for example, the product of dehydration is sufficiently strained to prevent exocyclic elimination as in the case of the compound of the formula IV

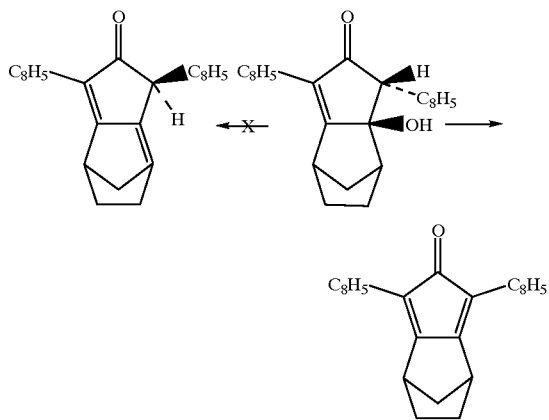

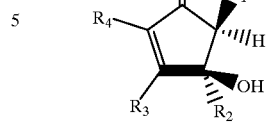

Preferably $R_1$ and $R_4$ are together sufficiently large to prevent any dimerisation by a Diels Alder reaction of the cyclopentadienone resulting from the irradiation since this may, in some circumstances give a colourless product, for example if dimerisation interrupts conjugation in the chromophone. However, in other circumstances, where the dimer absorbs in the visible spectrum, the indicia may be caused by the dimer.

In the compounds of the general formula I the groups $R_1$ and $R_4$ may be aryl groups, either homocyclic or heterocyclic, (and preferably either phenyl or naphthyl, especially phenyl) which may be unsubstituted or substituted by either electron withdrawing or electron donating groups, preferably by alkyl, alkoxy or nitro groups or by halogen atoms, and especially by methoxy or nitro groups or by bromine atoms.

The surface is preferably irradiated by means of a ultraviolet laser and especially an excimer laser at a typical fluence of from 0.1 to 4 J cm$^{-2}$.

The compound may be incorporated into any article that it is desired to mark with a laser, for example the article may be an electrical wire or jacketted optical fibre or a cable comprising one or more electrical wires and/or optical fibres. Alternatively, the article may comprise moulded plastic housings for domestic or industrial equipment, credit and other cards for financial transactions.

The compound of the formula I acts in a sense like a SMART dye (i.e. one which responds to environmental conditions and forms a colour accordingly). The compound is able to withstand the melt temperatures of the medium in which it is incorporated, but on application of the appropriate electromagnetic energy, can undergo a photochemical conversion to an isomeric form (also colourless) that is less thermally stable and which can undergo a thermal reaction at much lower temperatures to produce a black or highly coloured product that is completely photochemically and thermally stable. This property enables the compound of the formula I to be employed in articles that are used in a number of additional fields such as security coatings and anticounterfeit and tamper proof films and wrappings.

Thus, according to yet another aspect, the invention provides a method of forming an article which has a surface comprising a polymeric composition that incorporates a quantity of a compound of the general formula V

V wherein $R_1$ and $R_4$, which may be the same or different, each is a straight-chain, branched-chain or cyclic alkyl group or an aryl group, which groups may be unsubstituted or substituted and may include one or more hetero atoms.

$R_2$ is a straight-chain, branched-chain or cyclic alkyl group or an aryl which may be unsubstituted or substituted and may include one or more hetero atoms, but which does not include any eliminatable α-hydrogen atoms; and $R_3$, which may be fused with or separate from $R_2$ or which may be fused with or separate from $R_4$, is a straight-chain, branched-chain or cyclic alkyl group or an aryl group which may be unsubstituted or substituted and may include one or more hetero atoms;

provided that, when water is eliminated from the compound of the general formula I to form a cyclopentadienone, the groups $R_1$ to $R_4$ together have sufficient conjugated unsaturation to produce an absorption band in the visible spectrum;

which method comprises incorporating in a polymeric material a quantity of a compound of the general formula I

I

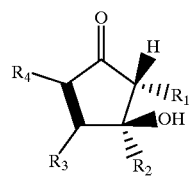

wherein the groups $R_1$ to $R_4$ are as defined with respect to the compound of the general formula V, and exposing the polymeric material to ultraviolet radiation to cause at least some of the compound of the general formula I to undergo a photochemical rearrangement to the compound of the general formula V.

Where the security article is applied thermally, for example in the form of a dimensionally heat-recoverable (shrink wrap) film, the article may be subjected to intense ultraviolet light after it has been applied to a substrate, thereby allowing the compound to undergo α cleavage and rearrangement. The resulting compound can be chosen so that it will change colour at temperatures below those required for application of the article to the substrate so that any attempt to remove the article thermally will leave a mark. Alternatively, in other cases the film or wrapping may be removed without detectable damage but when an attempt is made to re-apply the film or wrapping, the necessary thermal treatment will cause the trans-hydroxyketone in the film or wrapping to dehydrate and the film or wrapping will become coloured, indicating that an attempt has been made to reuse the film or wrapping.

Such articles may include coatings applied to credit cards, passports, as wrappings applied thermally for drugs and pharmaceuticals, and tamper proof wrappings applied thermally to all kinds of packages and containers such as whiskey bottles, video cassettes etc. The article may contain other security features such as fluorescent marks, overprinting etc., and of course it is possible to write on the article by means of a laser as described above.

Yet a further application of the article according to the present invention is in the provision of indication that products have (or have not) been subjected to elevated temperatures. Such products may include foodstuffs that are intended to be heat-treated e.g. sterilised or pasteurised, or medical equipment and the like.

The article may be formed from any of a number of polymers, for example from low, medium or high density polyethylene, linear low density polyethylene, polypropylene polystyrene, ethylene vinyl acetate copolymers, ethylene ethyl acrylate copolymers, polyvinyl chloride polyamides, polyimides, fluoropolymers such as ETFE or reconstituted cellulose. The compound may be incorporated into the polymer by melt blending provided that the melting point of the polymer is not so high as to cause thermal dehydration of the compound. Alternatively it may be possible to imbibe the compound. The compound will normally be present in an amount of at least 0.05% by weight and especially at least 0.1% by weight but usually not more than 0.5% by weight, based on the weight of the polymer. The polymer may include other additives commonly employed, for example fillers, antioxidants, ultraviolet stabilisers, plasticisers, flame retardants, fungicides and the like.

The following examples illustrate the invention.

EXAMPLE 1

Equimolar quantities of 1,3-diphenylpropan-2-one and benzil were dissolved in ethanol and a one fifth molar proportion of potassium hydroxide in ethanol was added dropwise. After stirring the solution for one hour, the solution was cooled and the near colourless solid was filtered off and recrystallised from chloroform to give 3-hydroxy-cis-2,3,4,5-tetraphenylcyclopent-4-enone-1(m.p. 198° C.) in an 83% yield. The compound had an absorption peak at 340 nm.

X-Ray analysis established the structure and stereochemistry. The compound (0.2 g) was dissolved in molten polypropylene (40 g) maintained at 190° C. The colourless melt was moulded into sheets (ca. 2 mm thickness) by pressing between platens and allowing to cool. The white sheets were used for the laser marking tests.

The polypropylene sample was then marked with indicia using an excimer laser at a fluence of 1 Jcm$^{-1}$ to produce dark grey marks with a high degree of contrast. During the marking step, the cis hydroxyketone is isomerised and dehydrated to from 2,3,4,5-tetraphenylcyclopentadienone which has a broad absorption peak in the visible spectrum with a maximum at 514 nm.

EXAMPLES 2 TO 12

Compounds 1 to 6 shown in Scheme 1 and defined in Table 1 were prepared from reactants A and B in Table 1 by methods analogous to that given in Example 1. In order to prepare the cis-hydroxyketone (7), a solution of cis-4-hydroxy-2,3,4,5-tetraphenyl-2-cyclopenten-1-one (1, $R^1=R^2=H$) (3 g, 7.4 mmol) in isopropanol (150 cm$^3$) was irradiated in a photochemical reactor with a 200 watt mercury lamp for 48 hours. The solvent was removed and the residual colourless solid column chromatographed giving the cis-hydroxyketone (7)(2.37 g, 79%), m.p. 235–236° C. (ether).

Scheme 1

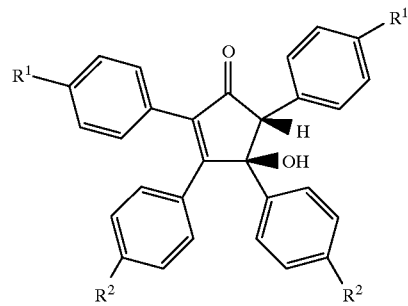
(1)

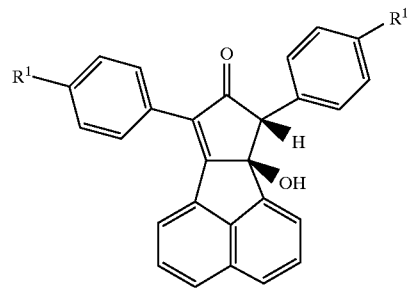
(2)

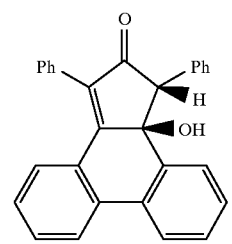
(3)

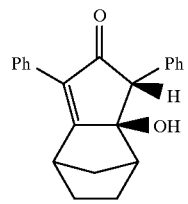
(4)

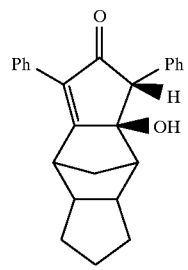
(5)

-continued (6)

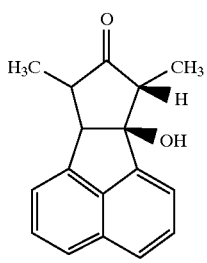

(7)

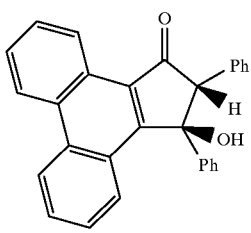

TABLE 1

| Example | Reactant A | Reactant B | cis-Hydroxyketone |
|---|---|---|---|
| 1 | 1,3-Diphenylpropan-2-one | Benzil | (1) $R^1 = R^2$ H |
| 2 | 1,3-Di(4-nitrophenyl)propan-2-one | Benzil | (1) $R^1 = NO_2$ $R^2 = H$ |
| 3 | 1,3-Di(4-bromophenyl)propan-2-one | Benzil | (1) $R^1 = Br$ $R^2 = H$ |
| 4 | 1,3-Di(4-methoxyphenyl)propan-2-one | Benzil | (1) $R^1 = OCH_3$ $R^2 = H$ |
| 5 | 1,3-Diphenylpropan-2-one | 4,4'-Dibromobenzil | (1) $R^1 = H$ $R^2 = Br$ |
| 6 | 1,3-Diphenylpropan-2-one | Acenaphthenquinone | (2) $R^1 = H$ |
| 7 | 1,3-Di(4-bromophenyl)propan-2-one | Acenephthenquinone | (2) $R^1 = Br$ |
| 8 | 1,3-Diphenylpropan-2-one | Phenanthrenquinone | (3) |
| 9 | 1,3-Diphenylpropan-2-one | Norcamphorquinone | (4) |
| 10 | 1,3-Diphenylpropan-2-one | Tricyclo $[5,2,1,0^{2\text{-}6}]$-decane-8,9-dione | (5) |
| 11 | 3-Pentanone | Acenaphthenquinone | (6) |

TABLE 2

| Example | cis-Hydroxyketone | M.P. (° C.) | Solvent of recrystallisation | Yield (%) | Colour* |
|---|---|---|---|---|---|
| 1 | (1) $R^1 = R^2 = H$ | 179–182 | Chloroform | 83 | Black |
| 2 | (1) $R^1 = NO_2$ $R2 = H$ | 134–135 | Dicholoro-methan | 61 | Dark red |
| 3 | (1) $R^1 = Br$, $R^2 = 11$ | 160–162 | Ether | 26 | Black |
| 4 | (1) $R^1 = OCH_3$ $R^2 = H$ | 178–179 | Ethanol | 58 | Black |
| 5 | (1) $R^1 = H$ $R^2 = Br$ | 109–111 | Ether | 62 | Dark red |
| 6 | (2) $R^1 = H$ | 229–231 | Ethanol | 73 | Black |
| 7 | (2) $R^1 = H$ | 270–272 | Dichloro-methane | 63 | Black |
| 8 | (3) | 239–242 | Chloroform | 80 | Black |
| 9 | (4) | Oil | — | 55 | Red |
| 10 | (5) | Oil | — | 51 | Red |
| 11 | (6) | 192–195 | THF | 59 | Yellow |
| 12 | (7) | 235–236 | Ether | 79 | Dark red |

Colour of the crystals of the cyclopentadienone derivatives after dehydration of cis-hydroxyketones.

We claim:

1. An article of manufacture which has a surface formed from a polymer composition, the polymer composition incorporating a quantity of a compound of the general formula I

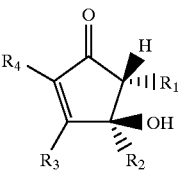

I wherein:

$R_1$ and $R_4$, which may be the same or different, each is a straight-chain, branched-chain or cyclic alkyl group or an aryl group, which groups may be unsubstituted or substituted and may include one or more hetero atoms;

$R_2$ is a straight-chain, branched-chain or cyclic alkyl group or an aryl group which may be unsubstituted or substituted and may include one or more hetero atoms, but which does not include any eliminatable α-hydrogen atoms; and $R_3$, which may be fused with or separate from $R_2$ or which may be fused or separate from $R_4$, is straight-chain, branched-chain or cyclic alkyl group or an aryl group which may be unsubstituted or substituted and may include one or more hetero atoms;

provided that, whenever water is eliminated from the compound of the general formula I to form a cyclopentadienone, the groups $R_1$ and $R_4$ together have sufficient conjugated unsaturation to produce an absorption band in the visible spectrum.

2. An article as claimed in claim 1, wherein each of the groups $R_1$ and $R_4$ do not contain any hetero atoms.

3. An article as claimed in claim 1, wherein $R_2$ and $R_3$ are separate groups.

4. An article as claimed in claim 1 wherein each of groups $R_1$ to $R_4$ are aryl groups.

5. An article as claimed in claim 1 wherein each of the groups $R_1$ to $R_4$ is a phenyl group that is unsubstituted, or substituted by one or more substituents selected from alkyl groups, alkoxy groups, nitro groups or halogen atoms.

6. An article as claimed in claim 1 wherein the compound has the generally formula III

III

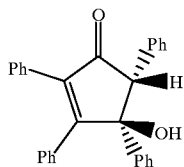

wherein Ph represents a phenyl group.

7. An article as claimed in claim 1, wherein $R_1$ and $R_4$ are each a phenyl group and $R_2$ and $R_3$ are each a p-bromophenyl group, a p-methoxyphenyl group or a 2 pyridyl are each a phenyl group.

8. An article as claimed in claim 1, wherein the groups $R_1$ and $R_4$ are each a p-nitrophenyl group, a p-methoxy phenyl group or a p-bromophenyl group and $R_2$ and $R_3$ are each a phenyl group.

9. An article as claimed in claim 1 which is an electrical wire, an optical fibre or an electrical and/or optical cable.

10. A method of making an article as claimed in claim 1, which comprises irradiating selected parts of the surface with a laser to form visible marks thereon.

11. A method as claimed in claim 10 wherein the laser is an excimer laser.

12. A method of forming an article which has a surface comprising a polymeric composition that incorporates a quantity of a compound of the general formula V

V

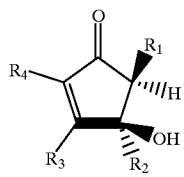

wherein:

$R_1$ and $R_4$ which may be the same or different, each is a straight-chain, branched-chain or cyclic alkyl group or an aryl group, which groups may be unsubstituted or substituted and may include one or more hetero atoms;

$R_2$ is a straight-chain, branched-chain or cyclic alkyl group or an aryl group which may be unsubstituted or substituted and may include one or more hetero atoms, but which does not include any eliminatable α-hydrogen atoms; and $R_3$ which may be fused with or separate from $R_2$ or which may be fused with or separate from $R_4$, is a straight-chain, branched-chain or cyclic alkyl group or an aryl group which may be unsubstituted or substituted and may include one or more hetero atoms;

provided that, whenever water is eliminated from the compound of the general formula I to form a cyclopentadienone, the groups $R_1$ and $R_4$ together have sufficient conjugated unsaturation to produce an absorption band in the visible spectrum;

which method comprises incorporating in a polymeric material a quantity of a compound of the general formula I

I

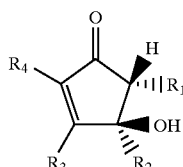

wherein the groups $R_1$ to $R_4$ are as defined with respect to the compound of the general formula V, and exposing the polymeric material to ultraviolet radiation to cause at least some of the compound of the general formula I to undergo a photochemical rearrangement to the compound of the general formula V.

13. A method as claimed in claim 12, which includes the step of applying the polymeric material to a substrate by a thermal means before the step of exposing it to ultraviolet radiation.

14. A method as claimed in claim 13, wherein during the step of applying the polymeric material to the substrate, it is heated to a temperature above the temperature at which the compound of the general formula V thermally dehydrates.

15. A method as claimed in claim 10, wherein in the compound of formula I each of the groups $R_1$ and $R_4$ do not contain any hetero atoms.

16. A method as claimed in claim 10, wherein in the compound of formula I each of $R_2$ and $R_3$ are separate groups.

17. A method as claimed in claim 10, wherein in the compound of formula I each of groups $R_1$ to $R_4$ are aryl groups.

18. A method as claimed in claim 10, wherein in the compound of formula I each of the groups $R_1$ to $R_4$ is phenyl group that is unsubstituted, or substituted by one or more substituents selected from alkyl groups, alkoxy groups, nitro groups or halogen atoms.

19. A method as claimed in claim 10, wherein the compound has the formula III:

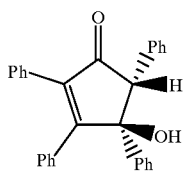

wherein Ph represents a phenyl group.

20. A method as claimed in claim 10, wherein in the compound of formula I the groups $R_1$ and $R_4$ are each a p-nitrophenyl group, a p-methoxy phenyl group or a p-bromophenyl group and $R_2$ and $R_3$ are each a phenyl group.

21. A method as claimed in claim 10, wherein said article is an electrical wire, an optical fibre, an electrical cable or an optical cable.

* * * * *

UNITED STATES PATENT AND TRADEMARK OFFICE
CERTIFICATE OF CORRECTION

PATENT NO. : 5,916,943
DATED : June 29, 1999
INVENTOR(S) : HELLER, et al.

It is certified that error appears in the above-identified patent and that said Letters Patent is hereby corrected as shown below:

Claim 1, line 47, after the word "is" and before the word "straight-chain", insert the word - - a - -.

Claim 6, line 2, after the word "the" and before the word "formula", delete the word "generally".

Claim 7, line 4, after the word "pyridyl" and before the ".", delete the phrase "are each a phenyl group".

Claim 12, lines 29-38, delete the following chemical structure:

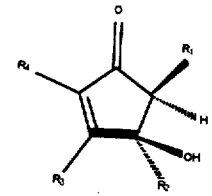

and insert the following chemical structure:

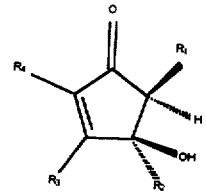

Claim 12, line 56, after "$R_1$" and before "$R_4$", delete the word "and" and insert therefore the word - - to - -.

Signed and Sealed this

Eighteenth Day of April, 2000

Attest:

Q. TODD DICKINSON

Attesting Officer    Director of Patents and Trademarks